3,830,821
PYRIDOXAL ALPHA - KETOGLUTARATE AND PYRIDOXAMINE ALPHA-KETOGLUTARATE

Cristobal Martinez Roldan and Miguel Fernandez, Madrid, Spain, assignors to Laboratorios Made, S.A., Madrid, Spain
No Drawing. Filed Oct. 10, 1972, Ser. No. 296,056
Int. Cl. C07d 31/36
U.S. Cl. 260—295 VB                 2 Claims

ABSTRACT OF THE DISCLOSURE

Pyridoxal alpha-ketoglutarate and pyridoxamine alpha-ketoglutarate possess anti-convulsant, weight increase and anti-hypnotic properties.

---

The purpose of the present invention is the industrial production of two derivatives of alpha-ketoglutaric acid, pyridoxal alpha-ketoglutarate and pyridoxamine alpha-ketoglutarate.

The formula of pyridoxal alpha-ketoglutarate is the folowing:

(I)

The formula of pyridoxamine alpha-ketoglutarate is the following:

(II)    (III)

This compound is represented by formulae II and III above owing to the fact that the compound according to formula II is easily isomerised to the compound of formula III.

The general synthesis method of these compounds is based on dissolving the acid and base separately with heat, in the smallest possible quantity of an appropriate solvent, mixing them subsequently. The mixture is cooled or concentrated according to the type of solvent used or, also, the salt may be precipitated with an appropriate solvent.

The salt may be used as such or may be dissolved in water and neutralised with organic or inorganic bases, the double salts being precipitated subsequently.

EXAMPLE 1

Preparation of pyridoxal alpha-ketoglutarate 146.10 grammes (1 mole) of alpha-ketoglutaric acid are dissolved in 300 ml. of hot ethanol and are added to a solution, also hot, of 167.10 grammes (1 mole) of pyridoxal in 550 ml. of ethanol. The mixture is heated to boiling point and if necessary is filtered at this temperature, to remove any solid which may exist in suspension. The solution is kept in a refrigerator and is filtered the following day. The results vary between 70 and 80% although precipitation may be increased by adding ether.

The product is purified for analysis by crystallisation in ethanol.

Analysis of pyridoxal alpha-ketoglutarate:
Calculated for $C_{13}H_{15}NO_8$: C: 49.84; H: 4.79; N: 4.47
Found: C: 50.26; H: 5.53; N: 4.27

The product is a solid formed of white crystals. MP= 127–128° C. (without correcting). It is soluble in water, alcohols of low molecular weight (hot) and very slightly in solvents of low or no polarity. With ferric chloride it gives a blood red colour. With copper sulphate it gives an emerald green colour.

Although the reaction has been carried out in various solvents, both organic and inorganic, that carried out in ethanol has been cited as an example since it is one of the best solvents.

EXAMPLE 2

Preparation of pyridoxamine alpha-ketoglutarate 146.10 grammes (1 mole) of alpha-ketoglutaric acid are dissolved in 300 ml. of hot ethanol and added to a solution, also hot, of 168.0 grammes (1 mole) of pyridoxamine in 550 ml. of ethanol. The mixture is heated to boiling point and if necessary it is filtered at this temperature to remove any solid which may exist in suspension. The solution is kept in a refrigerator and filtered the following day. The results vary between 52 and 75% although precipitation can be increased by adding ether.

The product is purified for analysis by crystallisation in ethanol.

Analysis of pyridoxamine alpha-ketoglutarate:
This product crystallises with two molecules of water, because of which it will have the molecular formula:

$$C_{13}H_{16}N_2O_6 \cdot 2H_2O.$$

Calculated for $C_{13}H_{20}N_2O_8$: C.—47.00; H.—6.02; N.—8.44
Found: C.—47.20; H.—6.00; N.—8.54

RMN spectrum ($D_2O$).—Bands appear which correspond to the mixture of the isomers. At $\tau=7.40$–8.12 a series of bands appear which are assigned to the pyridoxamine methyl group and the acid methylenes. At $\tau=6.30$ a triplet appears which corresponds to a tertiary hydrogen joined to a methylene, a nitrogen and the carboxyl group. At $\tau=5.75$ a thin band appears which is assigned to the CH bridge between the aliphatic nitrogen and the pyridine ring. At $\tau=4.92$ and 5.40 the methylene ground hydrogens joined to the pyridine ring appear. At $\tau=1.92$ the alpha-pyridine hydrogen appears. All values in p.p.m.

The product is a solid formed by yellow crystals. MP= 163–164° C. (without correcting). It is soluble in water, in alcohols of low molecular weight (with heat) and very slightly in solvents of low or no polarity. With ferric chloride it gives a browny red colour.

Although the reaction is carried out in various solvents, both organic and inorganic, that carried out in ethanol is cited as an example since this solvent is one of the best.

The products obtained by this method are new, in the opinion of the applicant firm and in the specific applications for which they are intended, they have the advantages of their high tolerance, powerful pharmacological activity and easy solubility in water.

Pharmacology of the Products Pyridoxal Alpha-Ketoglutarate and Pyridoxamine Alpha-Ketoglutarate The acute toxicity of both products is very similar. The $LD_{50}$ having been calculated by the Litchfield and Wilcoxon method, the following values were obtained for intravenous injection.

Pyridoxal alpha-ketoglutarate: 18.6 mg./mouse (930 mg./kg.)
Pyridoxamine alpha-ketoglutarate: 16.2 mg./mouse (810 mg./kg.)

These values show a very low toxicity. The animals die with acidosic coma symptoms and the injection velocity is critical for uniformity of the results.

Chronic toxicity carried out on mice, rats and guinea pigs for a six month period shows a complete tolerance including at very high doses of both products.

Anti-convulsive activity has been studied against $\beta$-ethyl-$\beta$-methylglutarimide, it being established that both products exercise a protective activity, that exercised by pyridoxal alpha-ketoglutarate being slightly lower. The results are significant in statistical analysis.

They also act as anti-convulsants against thiosemicarbazide, in this case with the same activity for both.

25 day old mice subjected to treatment with this product over 60 days showed an increase in weight compared with control samples which is reflected in the weight curve from the 8th to the 10th day. The increases observed are slightly greater for pyridoxamine alpha-ketoglutarate, although the difference between the two is not significant and the respective differences, compared with the control samples, are.

In animals put to sleep with pentobarbital both products act as awakeners with equal intensity, cutting the 50-effective times in a significant way. The method which has been used to make the comparison is that of J. T. Litchfield modified.

In arterial pressure records in an anaesthetised cat a discrete rise in pressure is observed on administering these products endovenously.

In clinical tests the product has shown the following therapeutic indications:

Changes in character, language and behaviour. Difficulty in apprenticeship, picking up and backwardness in schoolwork. Psycho-physical fatigue, neurasthenia, neurosis and in general whatever is desired to increase the intellectual output. Psycho-motor confusion (backwardness in walking, etc.). Psychogenic anorexia. Convulsive diseases. Pre-anaesthetic profilaxis and recovery from anaesthesia. Various intoxications affecting the central nervous system. States of obnubilation, stupor and comas of varied etiology (metabolic, toxic, traumatic, menignoencephalic and through vascular accidents). Vertiginous states. Nausea and vomiting. Acute and chronic alcoholism. Hepatitis and cirrhosis.

We claim:
1. Pyridoxal alpha-ketoglutarate.
2. Pyridoxamine alpha-ketoglutarate.

References Cited
UNITED STATES PATENTS 3,206,463   9/1965   Baetz _____ 260—295 VB ALAN L. ROTMAN, Primary Examiner U.S. Cl. X.R.

260—297.5; 424—266